United States Patent [19]

Csaszar et al.

[11] Patent Number: 5,060,689

[45] Date of Patent: Oct. 29, 1991

[54] UNIVERSAL CHECK VALVE ASSEMBLY

[75] Inventors: Gabor Csaszar, McHenry; Kenneth M. Kotowicz, Addison, both of Ill.

[73] Assignee: Ced's, Inc., Addison, Ill.

[21] Appl. No.: 398,183

[22] Filed: Aug. 24, 1989

[51] Int. Cl.[5] .......... F16K 15/14

[52] U.S. Cl. .......... 137/515; 137/512.15; 137/798; 137/799; 137/854; 251/148; 251/150; 251/359; 285/12; 285/175; 285/176; 285/240

[58] Field of Search .......... 137/515, 512.15, 843, 137/854, 798, 799, 859; 251/148, 150, 359; 285/175, 176, 177, 12, 240, 241

[56] References Cited

U.S. PATENT DOCUMENTS

| | | | |
|---|---|---|---|
| 928,797 | 7/1909 | Rohrbacher | 285/177 X |
| 969,358 | 9/1910 | Goodall | 285/177 |
| 1,748,774 | 2/1930 | Kellogg | 285/177 |
| 2,949,929 | 8/1960 | Moore | 137/843 X |
| 3,156,259 | 11/1964 | Havelka | 137/516.23 |
| 3,176,712 | 4/1965 | Ramsden | 137/515.7 X |
| 3,403,696 | 10/1968 | Pynchon | 137/854 X |
| 3,610,273 | 10/1971 | Russell | 137/854 X |
| 4,534,542 | 8/1985 | Russo | 137/843 X |
| 4,759,385 | 7/1988 | Hudson | 137/854 X |
| 4,815,576 | 3/1989 | Tanaka | 137/854 X |
| 4,867,200 | 9/1989 | Markley | 137/516.15 |

FOREIGN PATENT DOCUMENTS

| | | | |
|---|---|---|---|
| 556651 | 8/1932 | Fed. Rep. of Germany | 137/512.15 |
| 2291428 | 6/1976 | France | 137/854 |
| 1210013 | 10/1970 | United Kingdom | 137/854 |

*Primary Examiner*—Robert G. Nilson
*Attorney, Agent, or Firm*—Welsh & Katz

[57] ABSTRACT

A check valve assembly is disclosed which is inserted in a fluid flow conduit leading from a source of fluid flow to a mechanism utilizing the fluid flow. The check valve assembly comprises a housing having an inlet port and an outlet port that communicate with a central chamber in the housing, and a valve disposed in the central chamber adapted to permit fluid flow from the inlet port through the chamber to the outlet port and prevent fluid flow from the outlet port through the chamber to the inlet port. The housing comprises a first attachment piece associated with the inlet port and adapted to be attached to the fluid flow conduit leading from the source of fluid flow, and a second attachment piece associated with the outlet port and adapted to be attached to one of several adapter elements. Various types of adapter elements are disclosed which include sections for connecting the adapter element to the second attachment piece and to the fluid flow conduit leading to the mechanism utilizing the fluid flow.

20 Claims, 2 Drawing Sheets

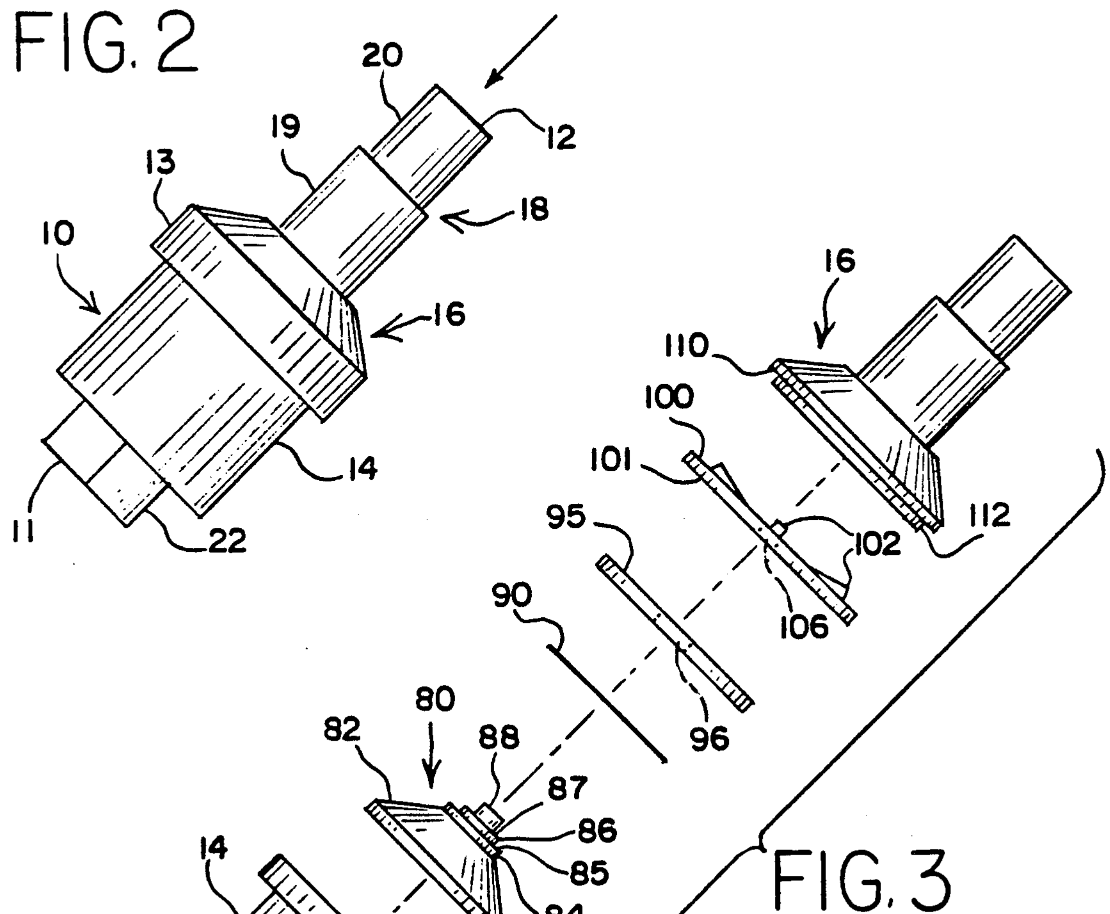
FIG. 2
20
12
19
13
18
10
16
14
11
22
16
110
100
101
112
95
102
106
90
96
80
82
88
87
86
85
84
14
114
22
24
23
FIG. 3
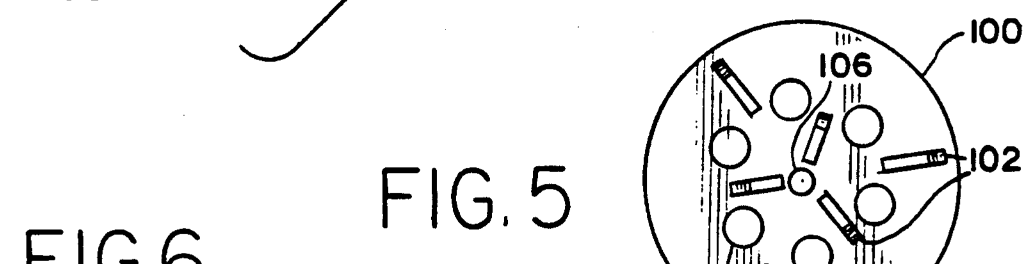
FIG. 4
100
106
102
104
FIG. 5
95
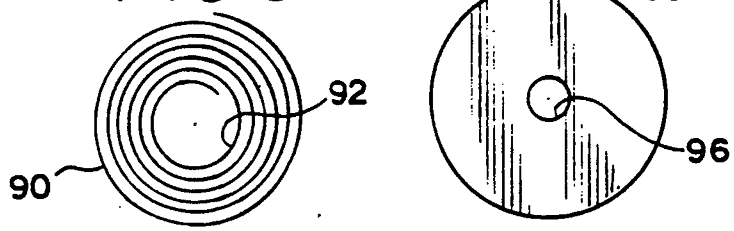
FIG. 6
92
90
96

UNIVERSAL CHECK VALVE ASSEMBLY

FIELD OF THE INVENTION

This invention relates to a check valve assembly. More particularly, the invention relates to a check valve assembly for use in automobile exhaust systems which provides an improved check valve and a variety of adaptive means for enabling the check valve to be used in any make or model of automobile.

BACKGROUND OF THE INVENTION

In automobile exhaust systems, it is advantageous to introduce air directly into the exhaust manifold or catalytic converter to assist in oxidizing the unburnt gaseous components contained in the exhaust gas. The air is supplied by an air pump, which is driven by the automobile engine and is therefore operable during the operation of the engine. A check valve is usually provided in the air supply conduit leading from the air pump to the catalytic converter or exhaust manifold to protect the air pump from corrosive exhaust gas which may backflow into the air supply conduit.

The presence of air in the air supply conduit downstream of the check valve and upstream of the exhaust manifold or catalytic converter generally provides an air cushion which prevents the high-temperature exhaust gases from coming into contact with the check valve. Nevertheless, when the air pump is not operating, the air cushion dissipates and exhaust gases may seep into the air supply conduit and come into contact with the check valve. These exhaust gases are of relatively high temperature. Therefore, check valves are typically made of heat resistant metals. However, the metal to metal contacts between the parts of these check valves are insufficient to adequately seal the check valve and prevent leakage of air. Furthermore, as the air cushion between the check valve and the source of exhaust gas diminishes, due to leakage in the check valve, exhaust gases are allowed to come into contact with the metal parts of the check valve. As a result, vaporized water and harmful gaseous components contained in the exhaust gas, such as nitrogen oxide and sulfur, condense on the metal parts, forming such corrosive compounds as sulfuric acid. The effect of the corrosive compounds on the metal check valves greatly reduces their ability to prevent a backflow of exhaust gas from reaching the air pump.

One prior device, described in U.S. Pat. No. 3,871,175, attempts to solve this problem by providing two check valves in the air supply conduit: a metal check valve adjacent to the source of high-temperature exhaust gases, and a plastic check valve adjacent to the air pump. Such a system is obviously more costly than a single check valve system, and fails to solve the problem of providing a single check valve which is capable of effectively protecting the air pump from a backflow of exhaust gases.

To overcome the problems caused by corrosion in metal check valves, a plastic check valve is sometimes used. Although constructed of high temperature plastic, the internal parts to these check valves may still be affected by the heat of the exhaust gases. For example, a valve seat subjected to high temperatures may deform, resulting in an incomplete seal between the valve element and the valve seat. As a result, the check valve is unable to prevent the backflow of exhaust gases from reaching the air pump.

Another problem encountered in air supply systems employing check valves is that different makes and models of automobiles require different connections between the check valve and the air supply conduit, the catalytic converter, or the exhaust manifold. In addition, many check valves are manufactured with different lengths and configurations of air supply conduit already attached. Therefore, if a check valve needs to be replaced, the mechanic must return to the manufacturer to obtain an identical check valve assembly, causing substantial delay in returning the automobile to service. Moreover, since some of these existing check valve assemblies are cumbersome, extensive time and effort is usually required to replace a single check valve.

SUMMARY OF THE INVENTION

It is therefore an object of the present invention to provide an improved check valve which is capable of withstanding the high temperatures associated with automotive exhaust gases, as well as being resistant to the corrosive effects of the exhaust gases. It is a further object of the present invention to provide a single, universal check valve assembly that can be used in any make or model of automobile.

According to the present invention, there is provided a universal check valve assembly having an improved check valve element and a plurality of different adapters to enable the check valve to be connected to the air supply conduit leading to the exhaust manifold or catalytic converter. This object is achieved by providing with the check valve a variety of adapters of different types and sizes and a flexible hose, which, when combined with the check valve, can be utilized in any make or model of automobile.

A plurality of adapters having upper threaded sections are designed to engage the internal threads of a coupling extending from the bottom of the check valve housing. The lower sections of a first set of adapters have either external or internal threaded sections for engaging the internal or external threads, respectively, of the air supply conduit, the exhaust manifold, or the catalytic converter, depending on the parameters encountered in the particular automobile.

Where it is necessary to replace an existing check valve having a length of air supply conduit attached thereto, at least one adapter in the present invention is provided with a cylindrical lower section for engaging one end of a flexible hose. A variety of other adapters are provided having cylindrical upper sections, which can be inserted into the other end of the flexible hose. These other adapters are provided with either externally or internally threaded lower sections for engaging the internal or external threads, respectively, of the remaining section of air supply conduit, the exhaust manifold, or the catalytic converter, depending on the particular application involved. Thus, the assembly of the present invention can be made to be substantially similar to the check valve assembly being replaced.

The types and sizes of the above-described adapters are chosen to enable the improved check valve of the present invention to be used as a replacement for any check valve assembly currently existing. The adapters can be color coded and used with a corresponding chart to assist the mechanic in selecting the appropriate fitting for the particular automobile. Thus, a mechanic can replace any existing check valve assembly with a single universal assembly of this invention by simply selecting the appropriate adapters provided with the inventive assembly.

The present invention also concerns an improved check valve having a housing and internal parts constructed of a high temperature thermoplastic capable of withstanding the corrosive effects of the exhaust gas. The inflow section of the check valve housing is a cylinder having a plurality of diameters, thus enabling the check valve to be connected to any size air supply conduit. The check valve housing is manufactured in two pieces which, during assembly, are ultrasonically welded together to form a unitary housing incapable of leaking. The thermoplastic valve seat of the improved check valve is constructed with a series of reinforcing ribs, which provide stability and prevent the valve seat from deforming when it is subjected to the heat of the exhaust gas.

These and other objects and advantages of the present invention will become apparent from the following description with reference to the accompanying drawings.

BRIEF DESCRIPTION OF THE DRAWINGS

FIG. 2 is a side view of the check valve;

FIG. 3 is an exploded, partial cross-sectional side view of the check valve;

FIG. 4 is a top view of the valve seat;

FIG. 5 is a top view of the flexible valve member; and

FIG. 6 is a top view of the coil spring.

DETAILED DESCRIPTION OF PREFERRED EMBODIMENTS

Figure 1:
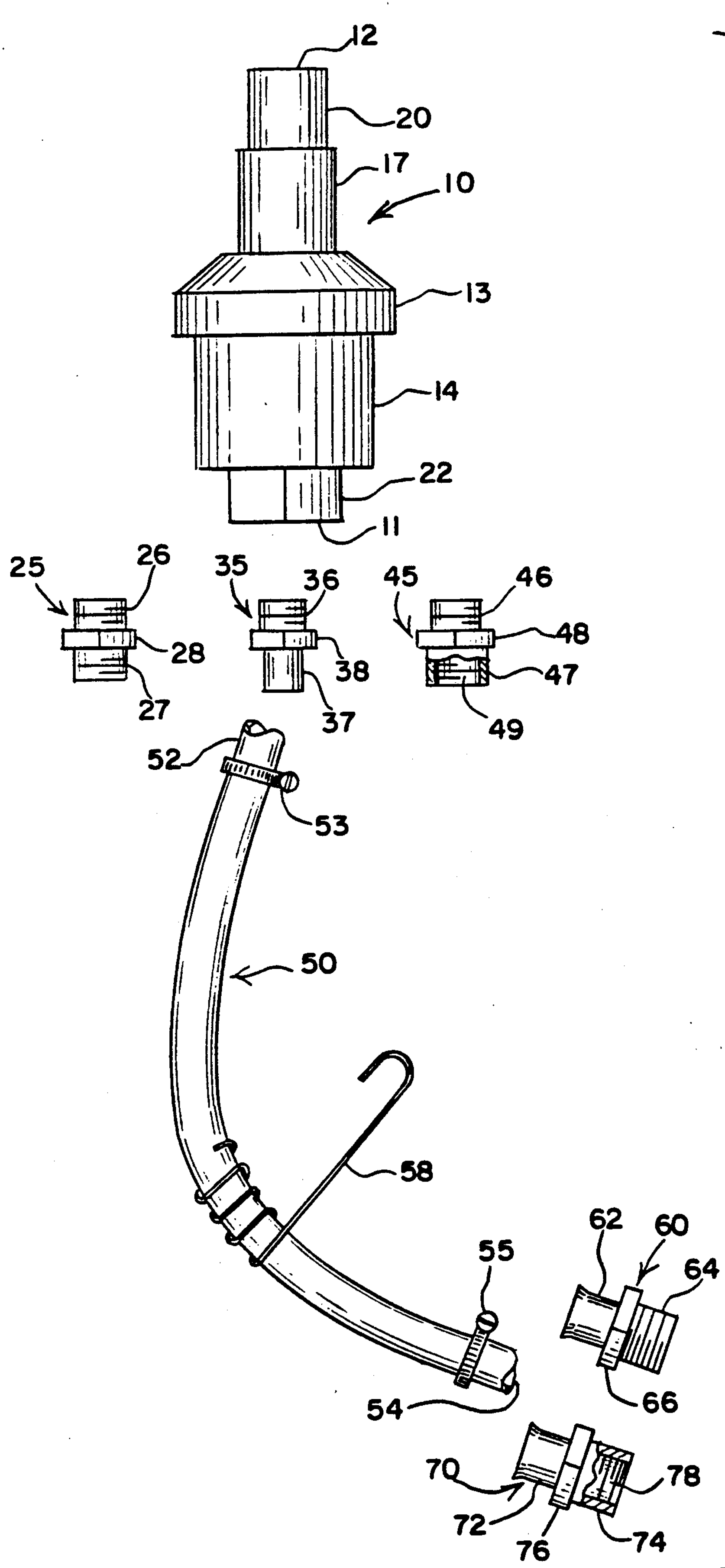
FIG. 1 is a simplified schematic view of the various elements of the universal check valve assembly according to the present invention, showing some elements partially in section.

Referring to FIG. 1, there is shown the elements of the universal check valve assembly of the present invention, including a check valve 10. Adapters 25, 35, 45, 60, 70, and flexible hose 50 are elements of the assembly, and enable check valve 0 to be used in several different makes and models of automobiles. Check valve 10 can, however, be used alone in automobiles where no adaptation is required.

Adapters 25, 35, 45, 60 and 70 have hollow centers to allow air to pass therethrough substantially uninterrupted. These adapters allow the check valve 10 to be used in various automobiles that may require such transitions between the check valve 10 and the air conduit (not pictured) leading to the catalytic converter or exhaust manifold. Adapters 25, 35, 45 are provided with external upper threaded sections 26, 36, 46, respectively, for engaging the internal threads 23 (FIG. 3) of hexagonal coupling 22 extending from the lower section 14 of the check valve body 13. Adapters 25, 35, 45 comprise hexagonal midsections 28, 38, 48, respectively, which can be engaged by a wrench or similar tool during the fastening of these elements to check valve 10 and, if required by the particular make and model of automobile, the air conduit (not shown) leading to the catalytic converter or exhaust manifold. Adapters 25, 35, 45 are molded out of a high-temperature thermoplastic.

An assortment of adapters 25, 45 are provided with lower threaded sections 27, 47 having different sizes in both the metric and the English standard systems of measurement. The various adapters are color coded to aid in the selection of the proper adapter, each color representing the appropriate type and size adapter for a particular make and model of automobile.

Adapter 25 includes a lower external threaded section 27 for engaging the inner threaded section of an air conduit leading to a catalytic converter or exhaust manifold, thereby providing a male-to-male transition between the check valve 10 and the air conduit for use in those automobiles requiring such a transition. Adapter 45 includes a lower threaded section 47 with internal threads 49 for engaging the outer threaded section of an air conduit, thereby providing a male-to-female transition between check valve 10 and the air conduit for use in those automobiles requiring such a transition.

In those automobiles where the check valve is located at a distance from the catalytic converter, or the air conduit leading to the exhaust manifold or catalytic converter does not have a threaded section adjacent to the check valve, flexible hose 50 and adapter 35 are provided. Hose 50 is constructed of a high-temperature, flexible material, such as silicone-type rubber or Viton, and is provided with an inlet end 52 and outlet end 54. Adapter 35 has at its lower end a smooth, cylindrical section 37, which is inserted into the inlet end 52 of flexible hose 50 or the remaining length of air conduit leading to the exhaust manifold or catalytic converter. Thus, adapter 35 provides a transition connector between check valve 10 and flexible hose 50 or the existing air conduit. Cylindrical section 37 of adapter 35 is held within hose 50 or the existing air conduit by means of a hose clamp 53, or other suitable means. Hose 50 may be cut to any length desired, and, if necessary, retention element 58 can be used for attaching hose 50 to the car body or engine mounting (not shown) to provide stability for the hose.

Adapters 60, 70 provide a transition either between the exit end 54 of hose 50 and the air conduit (not shown) leading to the catalytic converter or exhaust manifold, or between exit end 54 of hose 50 and the catalytic converter or exhaust manifold directly. Adapters 60, 70 are provided with smooth, cylindrical upper sections 62, 72, respectively. Sections 62, 72 are inserted within exit end 54 of hose 50 and held therein by means of hose clamp 55, or other suitable means. Adapter 60 has a lower external threaded section 64 for engaging the inner threaded section of the air conduit, catalytic converter, or exhaust manifold, thereby providing for a male-to-female engagement between exit end 54 of hose 50 and the exhaust system in automobiles requiring such a connection. Adapter 70 has a lower section 74 having internal threads 78 for engaging the outer threaded section of the air conduit, catalytic converter, or exhaust manifold, thereby providing a female-to-male engagement between exit end 54 of hose 50 and the exhaust system in automobiles requiring such a connection. Adapters 60, 70 are constructed of a metallic material and have hexagonal midsections 66 and 76, respectively, which can be engaged by a wrench or similar tool during the fastening of these elements to the exhaust system of the particular automobile (not shown).

Referring to FIGS. 1 and 2, the universal check valve assembly features an improved check valve 10 having an inlet 12 and an outlet 11. The check valve housing 13 is composed of an upper section 16 and a lower section 14. The two sections 16, 14 of valve housing 13 are molded or constructed out of a durable, high temperature and corrosion resistant material, such as glass-filled nylon or Torlon®. In the preferred embodiment, sections 14, 16 are ultrasonically welded together to provide an air-tight seal in the check valve housing 13.

The upper section 16 of check valve 10 has a hollow inlet stem 18, with a larger diameter lower section 19 and a smaller diameter upper section 20. The two diameters at sections 19 and 20 allow for an air hose of any size currently in use in the automotive industry to be connected to the inlet side of check valve 10 without the need for an adapter.

Referring to FIG. 3, check valve 10 contains within its body 13 a disc-like valve seat 100, a substantially flat, flexible, disc-shaped valve member 95, a substantially flat biasing means or coil spring 90 constructed of stainless steel and having an aperture 92 (FIG. 6), and a conical support member 80. The outer perimeter of valve seat 100 resides in an annular seat 24 radially extending from the upper end of the lower section 14 of the check valve housing 13. When sections 14, 16 of the check valve housing 13 are connected at edges 114 and 110, such as by sonic welding or other suitable means, valve seat 100 is held firmly against annular seat 24 by an annular ring 112 extending from the lower edge 110 of upper section 16.

Conical support member 80 is attached to valve seat 100 by means of stem 88 extending through aperture 106 in valve seat 100 until plateau 87 of support member 80 contacts the lower surface of valve seat 100. Support member 80 is held in this position by means of stem 88 being deformed or mushroomed over aperture 106. Coil spring 90 resides on conical support 80 at outer circumference 84. Flexible valve member 95 resides on conical support 80 at plateau 85 and outer circumference 86. Coil spring 90 is fabricated to exert a force on flexible valve member 95 which biases the valve member into engagement with the lower face 101 of valve seat 100. Thus, valve member 95 is urged against valve seat 100 by means of coil spring 90.

Referring to FIGS. 3 and 5, flexible valve member 95 includes a central aperture 96 of substantially the same diameter as outer circumference 86 of the conical support member 80. This provides a sealing engagement between valve member 95 and support member 80. Valve member 95 is composed of a high temperature resilient material, such as Viton.

Referring to FIGS. 3 and 4, valve seat 100 is substantially disc-shaped and is provided with a plurality of valve openings 104 to allow for the passage of the air therethrough. The valve seat is molded out of high temperature plastic and is provided with a plurality of strengthening means or ribs 102 to maintain rigidity in the valve seat during operation and thereby prevent deformation which could result in leakage of the check valve assembly in operation. It is to be noted that the disc-shaped valve seat has a plurality of circular valve openings spaced a predetermined distance apart from each other at a predetermined distance from the periphery of the disc-shaped valve seat, and that the circular openings have centers passing through a circle concentric with the disc periphery. Furthermore, the plurality of valve openings is an even number, and an equal even number of reinforcing means is located on one surface of the disc-shaped valve seat. The valve seat preferably has six circular valve openings, and six generally wedge-shaped reinforcing ribs extending in a radial direction on the disc-shaped valve seat and alternating with each other such that one rib extends radially inwardly from between a pair of valve openings and an adjacent rib extends radially outwardly from between an adjacent pair of valve openings.

The universal check valve assembly is incorporated into the air supply conduit leading from the air pump to the exhaust manifold or catalytic converter by first attaching the air hose leading from the air pump to either the larger diameter section 19 or the smaller diameter section 20 of the upper section 16 of check valve 10, depending upon the diameter of the hose leading from the air pump. The air hose is clamped to either section 19 or 20 using a hose clamp similar to that identified by the numeral 53 in FIG. 1, or other equally suitable attachment means, to provide an air tight connection between the air hose and the check valve housing 13.

If the air supply conduit leading to the exhaust manifold or catalytic converter has a threaded connector on the end nearest the check valve, an appropriate adapter 25 or 45 is then selected. For example, if the threaded connector on the end of the air supply conduit has external threads, adapter 45 is selected. If the threaded connector on the end of the air supply conduit is internally threaded, adapter 25 is selected. Numerous adapters 25, 45 are provided having a plurality of threaded portions 27 and 49 to compensate for various threaded connectors used on air supply conduits in different automobiles.

If the end of the air supply conduit adjacent check valve 10 does not include a threaded coupling, adapter 35 is selected, and cylindrical section 37 of adapter 35 is inserted into the inlet end 52 of hose 50 and secured thereto by suitable clamping means, such as clamp 53.

Next, the air supply conduit is attached to opening 11 of check valve housing 10 either directly by means of adapters 25 or 45, or via air hose 50 by means of adapter 35. Hose 50 is attached as described above after the adapter 35 has been attached to the check valve housing. Here 50 is secured to the frame of the car or to the engine mounting system by retention element 58.

Finally, in automobiles where hose 50 is required to be used, an adapter 60 or 70 is attached to the remaining end of hose 50 by inserting section 62 or 72 into the outlet end 54 of hose 50. The adapter is held in place in hose 50 by means of clamp 55 or other suitable means. If the connection on the air supply conduit leading to the exhaust system is internally threaded on the end, adapter 60 is selected. If the connection on the air supply conduit leading to the exhaust system is externally threaded, adapter 70 is selected. Numerous adapters 60, 70 are provided having a plurality of threaded sections 64 and 74 to enable an adapter 60 or 70 to be connected to the lower end of hose 50 and be utilized with various sized threaded coupling elements.

In operation, air entering check valve 10 through inlet 12 passes through valve openings 104 in valve seat 100 and causes flexible valve member 95 to deform downward against the resistance provided by coil spring 90, thereby allowing air to pass through to outlet 11 in the check valve housing. Air and other gaseous substances flowing in the opposite direction and entering the check valve through outlet 11 are prevented from passing through valve opening 104 to inlet 12 by valve member 95, which, due to the force from coil spring 90 urging valve member 95 against valve seat 100, sealingly engages the apertures 104 in valve seat 100 and thereby blocks reverse flow through the apertures 104.

Therefore, it should be recognized that, while the invention has been described in relation to preferred embodiments thereof, those skilled in the art may develop a wide variation of structural details without departing from the principles of the invention. Therefore, the appended claims are to be construed to cover all equivalents falling within the true scope and spirit of the invention.

We claim:

1. A check valve assembly, suitable for insertion into a fluid flow conduit leading from a source of fluid flow to a user of the fluid flow, said check valve assembly comprising:

a.) a housing having an inlet port and an outlet port communicating with a central chamber in said housing;

b.) first attachment means associated with said inlet port for attachment of said inlet port to a first fluid flow conduit leading from a source of fluid flow;

c.) second attachment means associated with said outlet port for attachment of said outlet port to an adapter element means;

d.) adapter element means including means for connecting said adapter element means to said second attachment means and to a second fluid flow conduit leading to a fluid flow user; and, e.) valve means disposed in said central chamber for permitting fluid flow from said inlet port through said chamber to said outlet port, and for preventing a reversal of fluid flow from said outlet port through said chamber to said inlet port, said valve means comprising a flat disc-shaped valve seat having first and second disc surfaces and a disc periphery, and further including an even number of flow apertures passing through said valve seat and an equal number of reinforcing ribs extending in a radial direction on a surface of said valve seat and alternating with each other such that one rib extends radially inwardly from between a pair of flow apertures and an adjacent rib extends radially outwardly from between a pair of flow apertures.

2. The check valve assembly of claim 1 wherein said first attachment means includes a first section having a first outer dimension and a second section having a second outer dimension different from said first dimension, whereby first fluid flow conduits of different dimensions can be attached to the inlet port of said check valve assembly.

3. The check valve assembly of claim 2 wherein said first section of said first attachment means comprises a cylindrical shaped member surrounding said inlet port and having a first outer diameter, and said second section of said first attachment means comprises another cylindrical shaped member surrounding said inlet port and having a second outer diameter different from said first outer diameter.

4. The check valve assembly of claim 1 wherein said adapter element means comprises a first adapter having one end portion for removable attachment to said check valve assembly outlet port, and a second end portion for removable attachment to said second fluid flow conduit.

5. The check valve assembly of claim 4 wherein a second adapter having a first end portion for removable attachment to said outlet port and a second end portion for removable attachment to said second fluid flow conduit is included, said second end portion of said second adapter has a different dimension than the one end portion of said first adapter, and said second adapter is interchangeable with said first adapter when said first adapter is removed from said check valve assembly.

6. The check valve assembly of claim 4 wherein said second attachment means includes a threaded section; said first adapter includes a corresponding threaded section for mating engagement with said threaded section of said second attachment means; and said first adapter includes an additional threaded section for mating with a corresponding threaded section of said second fluid flow conduit.

7. The check valve assembly of claim 5 wherein the second end portion of said second adapter includes a smooth outer surface for insertion into and attached to said second fluid flow conduit.

8. The check valve assembly of claim 1 wherein said valve means further comprises a support member, a biasing means, and a valve member, and said biasing means urges the valve member into sealing engagement with said valve seat.

9. The check valve assembly of claim 1 wherein said valve seat comprises a plurality of circular flow apertures spaced a predetermined distance apart from each other and a predetermined distance from said disc periphery, said circular apertures having centers passing through a circle concentric with said disc periphery, and at least one reinforcing means is integrally mounted on a disc surface.

10. The check valve assembly of claim 1 wherein said reinforcing ribs are generally wedge-shaped.

11. The check valve assembly of claim 1 wherein said even number is six.

12. A valve seat for a valve assembly comprising a flat disc-shaped element having first and second disc surfaces and a disc periphery, having an even number plurality of valve openings spaced a predetermined distance apart from each other and a predetermined distance from said disc periphery, said valve openings having centers passing through a circle concentric with said disc periphery, and having an equal even number plurality of reinforcing ribs extending in a radial direction on a disc surface and alternating with each other such that one rib extends radially inwardly from between a pair of valve openings and an adjacent rib extends radially outwardly from between a pair of valve openings.

13. The valve seat of claim 12 wherein said valve openings are circular.

14. The valve seat of claim 12 said reinforcing ribs are generally wedge-shaped.

15. The valve seat of claim 12 wherein said even number is six.

16. A valve seat, suitable for use in a check valve assembly, comprising a disc-shaped element having first and second disc surfaces and a disc periphery, having at least six valve openings spaced a predetermined distance apart from each other and a predetermined distance from said disc periphery, said valve openings having centers passing through a circle concentric with said disc surface, and at least six reinforcing ribs extending in a radial direction on a disc surface and alternating with each other such that one rib extends radially inwardly from between a pair of valve openings and an adjacent rib extends radially outwardly from between a pair of valve openings.

17. A valve seat according to claim 16 wherein said valve openings are circular.

18. A valve seat according to claim 16 wherein said reinforcing ribs are generally wedge-shaped.

19. A check valve assembly, suitable for insertion into a fluid flow conduit leading from a source of fluid flow to a user of the fluid flow, said check valve assembly comprising:

a.) a housing having an inlet port and an outlet port communicating with a central chamber in said housing;

b.) valve means disposed in said central chamber for permitting fluid flow from said inlet port through said chamber to said outlet port, and for preventing a reversal of fluid flow from said outlet port through said chamber to said inlet port, said valve means comprising a flat disc-shaped valve seat containing a plurality of flow apertures and having first and second disc surfaces and a disc periphery, and further including reinforcing means integrally mounted on a disc surface;

c.) first attachment means associated with said inlet port for attachment of said inlet port to a first fluid flow conduit leading from a source of fluid flow, said first attachment means including a first section having a first outer dimension and a second section having a second outer dimension different from said first dimension, whereby first fluid flow conduits of different dimensions can be attached to the inlet port of said check valve assembly;

d.) second attachment means associated with said outlet port for attachment of said outlet port to an adapter element means; and, e.) adapter element means including means for connecting said adapter element means to said second attachment means and to a second fluid flow conduit leading to a fluid flow user.

20. The check valve assembly of claim 19 wherein said first section of said first attachment means comprises a cylindrical shaped member surrounding said inlet port and having a first outer diameter, and said second section of said first attachment means comprises another cylindrical shaped member surrounding said inlet port and having a second outer diameter different from said first outer diameter.

* * * * *

UNITED STATES PATENT AND TRADEMARK OFFICE
CERTIFICATE OF CORRECTION

PATENT NO. : 5,060,689

DATED : October 29, 1991

INVENTOR(S) : Gabor Csaszar

It is certified that error appears in the above-identified patent and that said Letters Patent is hereby corrected as shown below:

Column 3, line 42, delete "0" insert --10--; and

Column 6, line 63, delete "opening" insert --openings--.

Signed and Sealed this

Twenty-second Day of June, 1993

Attest:

Michael K. Kirk

MICHAEL K. KIRK

*Attesting Officer*

*Acting Commissioner of Patents and Trademarks*